(12) United States Patent
Van Rooyen

(10) Patent No.: US 7,286,794 B2
(45) Date of Patent: Oct. 23, 2007

(54) METHOD AND SYSTEM FOR JOINT BROADCAST RECEIVING AND CELLULAR COMMUNICATION AT MOBILE TERMINAL OR DEVICE WITHOUT SERVICE CONTROL

(75) Inventor: Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 218 days.

(21) Appl. No.: 11/010,991

(22) Filed: Dec. 13, 2004

(65) Prior Publication Data

US 2006/0128426 A1 Jun. 15, 2006

(51) Int. Cl.
*H04H 7/00* (2006.01)

(52) U.S. Cl. .................. 455/3.06; 455/140; 455/143; 455/180.1; 455/188.2; 455/192.3; 455/426.1; 455/552.1

(58) Field of Classification Search ............... 455/3.06, 455/140, 143, 150.1, 180.1, 180.2, 188.2, 455/192.3, 63.3, 426.1, 552.1, 553.1
See application file for complete search history.

(56) References Cited

U.S. PATENT DOCUMENTS

| 7,103,374 | B2 | 9/2006 | Yia-Jaaski et al. | |
|---|---|---|---|---|
| 2002/0059614 | A1* | 5/2002 | Lipsanen et al. | 725/75 |
| 2004/0171381 | A1* | 9/2004 | Inselberg | 455/426.2 |
| 2006/0123099 | A1* | 6/2006 | Paila et al. | 709/219 |

OTHER PUBLICATIONS

Siemens Mobile, Broadcasting @ Siemens Mobile, ICM MP, Martin Gebler, Broadcast Media in Mobile, London, Apr. 20, 2004, ICM MP SM BD, IPDC, pp. 1-13.

DVB © Digital Video Broadcasting, Transmission System for Handheld Terminals (DVB H), DVB Document A081, Jun. 2004, pp. 1-11.

DVB © Digital Video Broadcasting, The Convergence of Broadcast & Telecommunications Platforms, TM2466 Rev 4, UMTS23Rev1, written by ad hoc Group DVB-UMTS, Editor: Rainer Lueder, Report No. 1 (full), Jun. 2, 2002, pp. 1-73.

* cited by examiner

*Primary Examiner*—Nick Corsaro
*Assistant Examiner*—Inder Pal Mehra
(74) *Attorney, Agent, or Firm*—McAndrews, Held & Malloy Ltd.

(57) ABSTRACT

Methods and systems for communicating information via a plurality of different networks are disclosed herein. Aspects of the method may comprise receiving broadcast information in a mobile terminal via a VHF/UHF broadcast communication path. Cellular information in the mobile terminal comprising voice and data may be received via at least one cellular communication path. Reception in the mobile terminal may be switched between reception of the broadcast information via the VHF/UHF broadcast communication path and the cellular information via the at least one cellular communication path based on a preference indicated via the mobile terminal. The preference may be indicated via a software-controlled interface and/or a user-controlled interface. Reception in the mobile terminal may be switched between reception of the broadcast information via the VHF/UHF broadcast communication path and the cellular information via the at least one cellular communication path based on user input.

30 Claims, 10 Drawing Sheets

METHOD AND SYSTEM FOR JOINT BROADCAST RECEIVING AND CELLULAR COMMUNICATION AT MOBILE TERMINAL OR DEVICE WITHOUT SERVICE CONTROL

CROSS-REFERENCE TO RELATED APPLICATIONS/INCORPORATION BY REFERENCE

This application makes reference to:
U.S. patent application Ser. No. 11/010,847, filed Dec. 13, 2004;
U.S. patent application Ser. No. 11/010,461, filed Dec. 13, 2004;
U.S. patent application Ser. No. 11/010,877, filed Dec. 13, 2004;
U.S. patent application Ser. No. 11/010,914, filed Dec. 13, 2004;
U.S. patent application Ser. No. 11/010,486, filed Dec. 13, 2004;
U.S. patent application Ser. No. 11/010,903, filed Dec. 13, 2004;
U.S. patent application Ser. No. 11/011,009, filed Dec. 13, 2004;
U.S. patent application Ser. No. 11/010,855, filed Dec. 13, 2004;
U.S. patent application Ser. No. 11/010,743, filed Dec. 13, 2004;
U.S. patent application Ser. No. 11/010,983, filed Dec. 13, 2004;
U.S. patent application Ser. No. 11/011,000, filed Dec. 13, 2004;
U.S. patent application Ser. No. 11/010,681, filed Dec. 13, 2004;
U.S. patent application Ser. No. 11/010,883, filed Dec. 13, 2004;
U.S. patent application Ser. No. 11/011,006, filed Dec. 13, 2004;
U.S. patent application Ser. No. 11/010,487, filed Dec. 13, 2004;
U.S. patent application Ser. No. 11/010,481, filed Dec. 13, 2004; and
U.S. patent application Ser. No. 11/010,524, filed Dec. 13, 2004.

All of the above stated applications are hereby incorporated herein by reference in their entirety.

FEDERALLY SPONSORED RESEARCH OR DEVELOPMENT

Not applicable.

MICROFICHE/COPYRIGHT REFERENCE

Not applicable.

FIELD OF THE INVENTION

Certain embodiments of the invention relate to communication of information via a plurality of different networks. More specifically, certain embodiments of the invention relate to a method and system for joint broadcast receiving and cellular communication at mobile terminal or device without service control.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (W-CDMA) to support data transfer rates, which may be as high as 2 Mbits/s. One reason why W-CDMA may support higher data rates is that W-CDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts W-CDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 μs for an 8 MHz channel. In the "8K" mode there are 6,817 carrier frequencies, each with a useful symbol duration of 896 μs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause intersymbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data—forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 μs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

Further limitations and disadvantages of conventional and traditional approaches will become apparent to one skilled in the art, through comparison of such systems with some aspects of the present invention as set forth in the remainder of the present application with reference to the drawings.

BRIEF SUMMARY OF THE INVENTION

Certain embodiments of the invention may be found in a method and system for communicating information via a plurality of different networks. Aspects of the method may comprise receiving broadcast information in a mobile terminal via a VHF/UHF broadcast communication path. Cellular information in the mobile terminal comprising voice and data may be received via at least one cellular communication path. Reception may be switched via the mobile terminal between reception of the broadcast information via the VHF/UHF broadcast communication path and the cellular information via the at least one cellular communication path based on a preference indicated via the mobile terminal. The preference may be indicated via a software-controlled interface and/or a user-controlled interface. Reception in the mobile terminal may be switched between reception of the broadcast information via the VHF/UHF broadcast communication path and the cellular information via the at least one cellular communication path based on user input.

The user input may be acquired by the mobile terminal utilizing a hardware or software button. An input may be received that selects a portion of content associated with the broadcast information and a portion of the cellular information. The selected portion of content associated with the broadcast information may be received via the VHF/UHF broadcast communication path. The selected portion of the cellular information may be received via the at least one cellular communication path. An indication of content that may be available via the VHF/UHF broadcast communication path and the at least one cellular communication path may be displayed. The broadcast information may be received from a service provider. A request for broadcast information may be generated by the mobile terminal that instructs the service provider to deliver the requested broadcast information via the VHF/UHF broadcast communication path.

Another embodiment of the invention may provide a machine-readable storage, having stored thereon, a computer program having at least one code section executable by a machine, thereby causing the machine to perform the steps as described above for communicating information via a plurality of different networks.

Aspects of the system may comprise circuitry in a mobile terminal that receives broadcast information via a VHF/UHF broadcast communication path. Circuitry in the mobile terminal may be provided that receives cellular information comprising voice and data via at least one cellular communication path. The mobile terminal may comprise circuitry that switches between reception of the broadcast information via the VHF/UHF broadcast communication path and the cellular information via the at least one cellular communication path based on a preference indicated via the mobile terminal. The preference may be indicated via a software-controlled interface and/or a user-controlled interface. The mobile terminal may also comprise circuitry that switches between reception of the broadcast information via the VHF/UHF broadcast communication path and the cellular information via the at least one cellular communication path based on user input.

The mobile terminal may comprise a hardware button which may be utilized to facilitate the user input, which may be acquired by circuitry in the mobile terminal. The mobile terminal may comprise circuitry that may be adapted to receive an input that selects at least a portion of content associated with the broadcast information and at least a portion of the cellular information. The selected portion of content associated with the broadcast information received by the VHF/UHF broadcast communication path may be received and processed by circuitry in the mobile terminal. The selected portion of the cellular information received via the at least one cellular communication path may be received and processed by circuitry in the mobile terminal. An indication of content that may be available via the VHF/UHF broadcast communication path and the at least one cellular communication path may be displayed by circuitry in the mobile terminal. The broadcast information may be received by circuitry in the mobile terminal from a service provider. The mobile terminal may comprise circuitry that requests broadcast information and instruct the service provider to deliver the requested broadcast information via the VHF/UHF broadcast communication path.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communicating information via a plurality of different networks. Broadcast information may be received in a mobile terminal via a VHF/UHF broadcast communication path and cellular information may be received in the mobile terminal via one or more cellular communication paths. The cellular information may comprise voice and/or data. Reception in the mobile terminal may be switched between reception of the broadcast information and the cellular information based on a preference indicated via the mobile terminal. The preference may be indicated via a software-controlled interface and/or a user-controlled interface, for example. Reception in the mobile terminal may be switched between reception of the broadcast information via the VHF/UHF broadcast communication path and the cellular information via the at least one cellular communication path based on user input. The user input may be indicated via a hardware button input, for example.

Figure 1A:
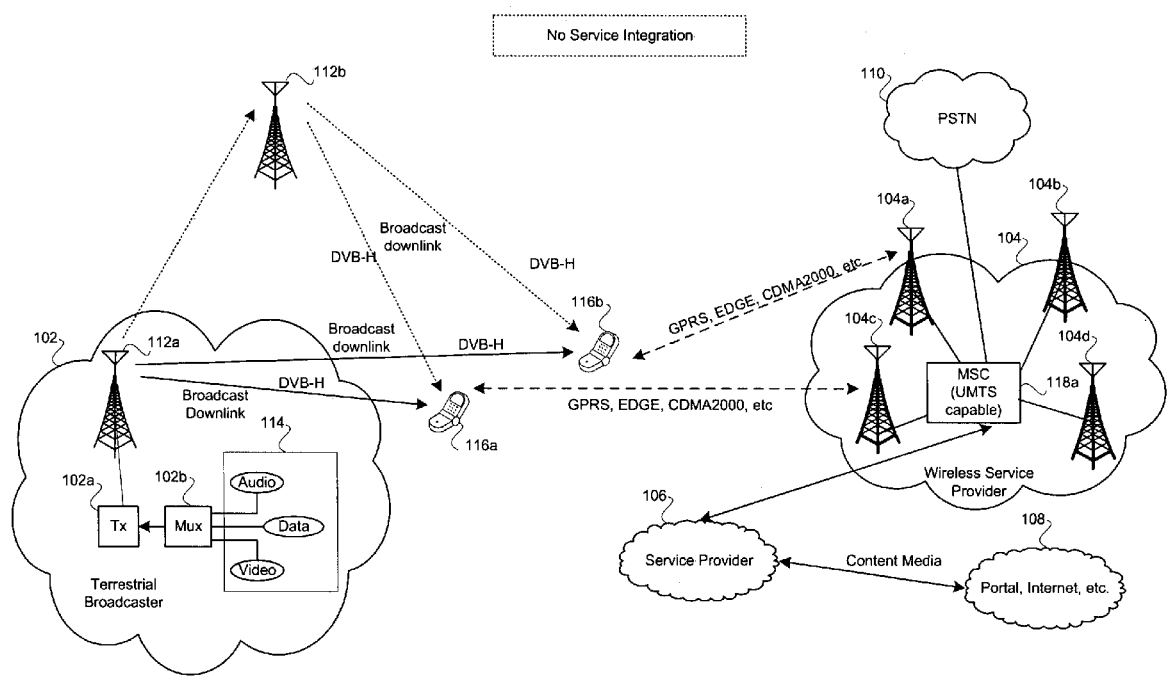
FIG. 1*a* is a block diagram of an exemplary system for providing services between a cellular network and a digital video broadcast network, in accordance with an embodiment of the invention.

FIG. 1a is a block diagram of an exemplary system for providing services between a cellular network and a digital video broadcast network, in accordance with an embodiment of the invention. Referring to FIG. 1a, there is shown terrestrial broadcaster network 102, wireless service provider network 104, service provider 106, and network 108 which may comprise the Internet, a portal, for example. FIG. 1a further comprises public switched telephone network (PSTN) 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a and 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe or stream for transmission by the transmitter 102a.

Although communication links between the service provider 106 and the wireless service provider 104 may be wired communication links, the invention may not be so limited. Accordingly, the communication links may comprise a wireless communication link. In an exemplary embodiment of the invention, the communication link between the service provider 106 and the wireless service provider 104 may be an 802.x based communication link, such as an 802.16 or WiMax broadband access communication link. In another exemplary embodiment of the invention, the communication link may comprise a broadband line of sight (LOS) connection.

The wireless service provider network 104 may be a cellular network, such as a personal communications service network. Usage of the term cellular may comprise any band of frequencies that may be utilized for cellular communication. The wireless service provider network 104 may utilize cellular access technologies such as GSM, CDMA, CDMA2000, WCDMA, HSDPA, AMPS, N-AMPS, and/or TDMA. The cellular network may be utilized to offer bidirectional services via uplink and downlink communication channels. In this regard, other bidirectional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a and 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a. In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the mobile terminals 116a and 116b and the wireless communication network 104. In an illustrative embodiment of the invention the service provider 106 may be adapted to utilize its interfaces to facilitate exchange of control information with the wireless communication network 104 and to exchange control information with the mobile terminals 116a and 116b. The control information exchanged by the service provider 106 with the wireless communication network 104 and the mobile terminals 116a and 116b may be utilized to control certain operations of the mobile terminals and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the wireless communication network 104. Load management may be utilized to distribute the flow of information throughout the wireless communication network 104. For example, load may be distributed among the base stations 104a, 104b, 1.04c, 104d so as to optimally provide cellular and/or broadcast services to the mobile terminals 116a and 116b.

The service provider 106 may also be adapted to handle certain types of service requests, which may have originated from a mobile terminal. For example, the mobile terminal 116a may request that information be delivered to it via a cellular channel. As a result, the service provider 106 may route the requested information through a cellular channel via the base station 104c to the mobile terminal 116a. The requested information may be acquired from the portal 108, for example.

The network or portal 108 may comprise suitable interfaces, logic, circuitry and/or code that may be adapted to provide content media to the service provider 106 via one or more communication links. These communication links, although not shown, may comprise wired and/or wireless communication links. The content media that may be provided by the network or portal 108 may comprise audio, data, video or any combination thereof. In this regard, the network or portal 108 may be adapted to provide one or more specialized information services to the service provider 106.

The public switched telephone network (PSTN) 110 may be coupled to the MSC 118a. Accordingly, the MSC 118a may comprise suitable interfaces that may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110. In an embodiment of the invention, a T1, T3 or OC-x connection, for example, may be utilized to facilitate communication between the PSTN and the 110 and the MSC 118a.

In one aspect of the invention, the information content source 114 may comprise a data carousel. In this regard, the information content source 114 may be adapted to provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, a cellular channel from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast UHF/VHF technologies. In an exemplary embodiment of the invention, the mobile terminals 116a and 116b may be adapted to utilize one or more cellular access technologies such as GSM, GPRS, EDGE, CDMA, WCDMA, and CDMA2000. The mobile terminals may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may be adapted to receive VHF/UHF broadcast information from the VHF/UHF broadcast antennas 112a and 112b. In some instances, the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal, such as the mobile terminal 116a or 116b, may be adapted to received broadcast information via a VHF/UHF broadcast communication path and cellular information via one or more cellular communication paths. Reception in the mobile terminal may be switched between reception of the broadcast information and the cellular information based on a preference indicated via the mobile terminal. For example, the preference may be indicated via a software-controlled interface and/or a user-controlled interface. Reception in the mobile terminal may be switched between reception of the broadcast information via the VHF/UHF broadcast communication path and the cellular information via the at least one cellular communication path based on user input, where the user input may be indicated via a hardware button input, for example.

Figure 1B:
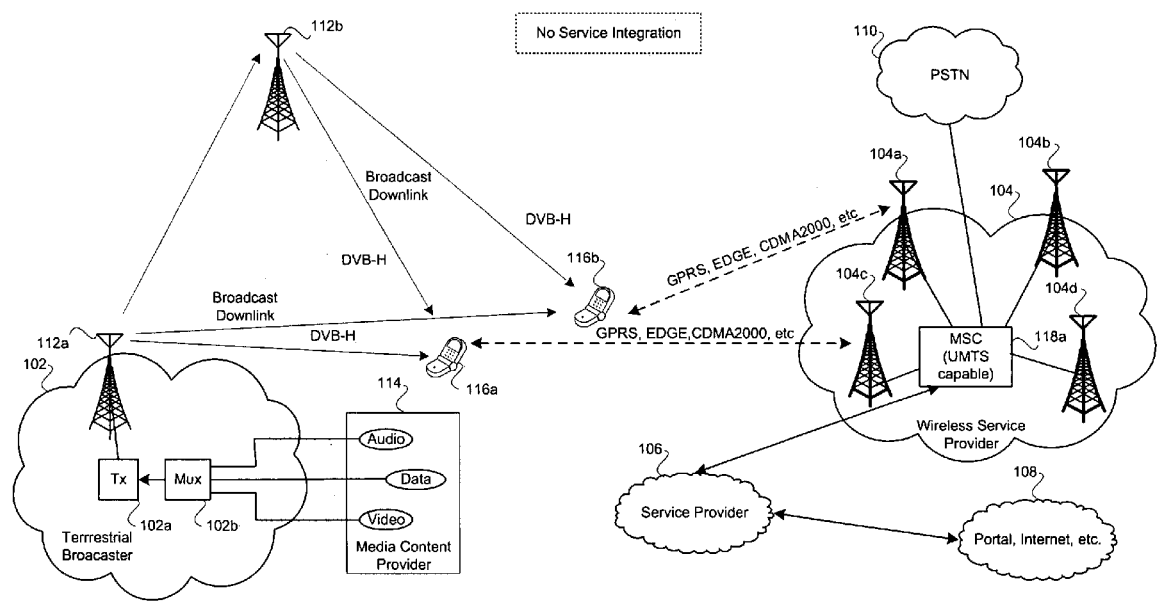
FIG. 1*b* is a block diagram of an alternative embodiment of the exemplary system of FIG. 1*a* for providing services between a cellular network and a digital video broadcast network, in accordance with an embodiment of the invention.

FIG. 1b is a block diagram of an alternative embodiment of the exemplary system of FIG. 1a for providing services between a cellular network and a digital video broadcast network, in accordance with an embodiment of the invention. Referring to FIG. 1b, there is shown terrestrial broadcaster network 102, wireless service provider network 104, a service provider 106, portal 108, public switched telephone network (PSTN) 110, and mobile terminals (MTs) 116*a* and 116*b*. The terrestrial broadcaster network 102 may comprise transmitter (Tx) 102*a*, multiplexer (Mux) 102*b*, and VHF/UHF broadcast antennas 112*a* and 112*b*. Although VHF/UHF broadcast antenna 112*b* is illustrated separately from the terrestrial broadcast network 102, it may still be part of the terrestrial broadcast network 102. The wireless service provider network 104 may comprise mobile switching center (MSC) 118*a*, and a plurality of cellular base stations 104*a*, 104*b*, 104*c*, and 104*d*.

The system of FIG. 1*b* is somewhat similar to FIG. 1*a* with the exception that FIG. 1*b* has the content source 114 located external to the terrestrial broadcast network 102. The content source 114, which may also be referred to as a data carousel, may comprise audio, data and video content. At least a portion of the audio, data and/or video content stored in the content source 114 may be linked so that, if information cannot be retrieved from the content source 114, then it may be received from the portal 108. In the system of FIG. 1*b*, a provider other than the terrestrial broadcaster 102 may manage the content source 114. Notwithstanding, the audio, video and/or data from the content source 114 may still be multiplexed by the multiplexer 102*b* in the terrestrial broadcast network 102.

Figure 1C:
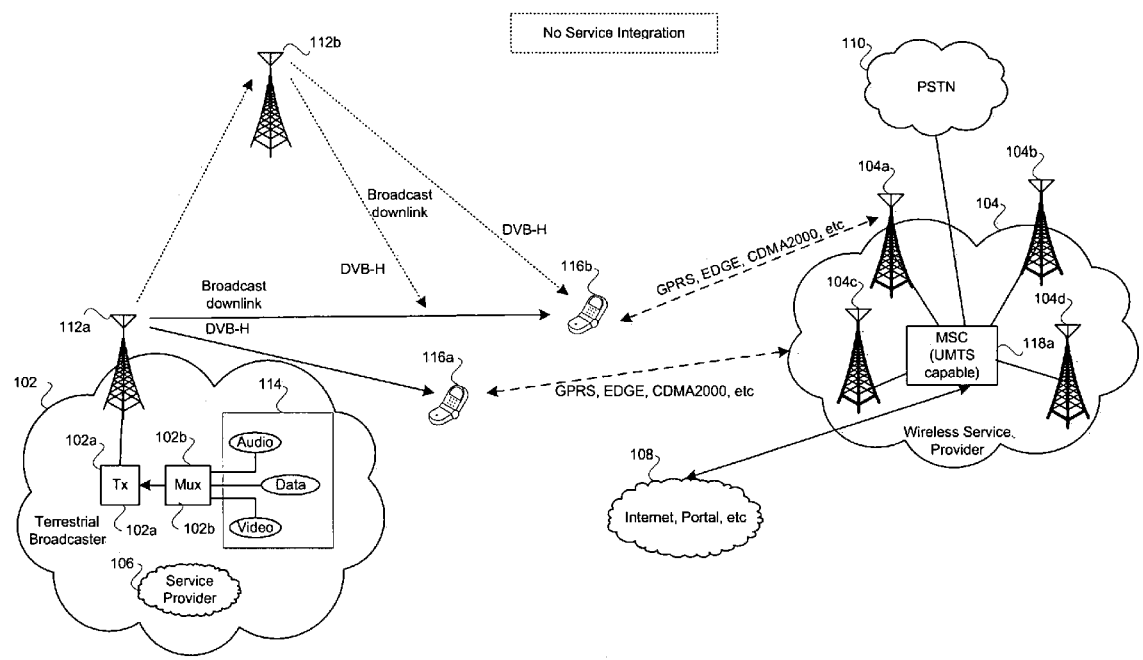
FIG. 1*c* is a block diagram of an alternative embodiment of the exemplary system of FIG. 1*a* for providing services between a cellular network and a digital video broadcast network, in accordance with an embodiment of the invention.

FIG. 1*c* is a block diagram of an alternative embodiment of the exemplary system of FIG. 1*a* for providing services between a cellular network and a digital video broadcast network, in accordance with an embodiment of the invention. Referring to FIG. 1*c*, there is shown terrestrial broadcaster network 102, wireless service provider network 104, portal 108, public switched telephone network (PSTN) 110, and mobile terminals (MTs) 116*a* and 116*b*. The terrestrial broadcaster network 102 may comprise transmitter (Tx) 102*a*, multiplexer (Mux) 102*b*, service provider 106, and VHF/UHF broadcast antennas 112*a* and 112*b*. The wireless service provider network 104 may comprise mobile switching center (MSC) 118*a*, and a plurality of cellular base stations 104*a*, 104*b*, 104*c*, and 104*d*.

The system of FIG. 1*c* is somewhat similar to the FIG. 1*a* with the exception that FIG. 1*b* has the service provider 106 co-located with the terrestrial broadcast network 102. In this regard, the terrestrial broadcast network 102 may control the functions of the service provider 106. Since the terrestrial broadcast network 102 controls the functions of the service provider 106, the broadcast services may be more efficiently provided to the mobile terminals 116*a* and 116*b* via the VHF/UHF broadcast downlink path provided by the terrestrial broadcast network 102. Hence, instead of having to send information to an externally located service provider, the terrestrial broadcaster network 102 and the service provider 106 may make decisions as to how best to handle communication of information to and/or from a mobile terminal. In this regard, the service provider 106 may also communicate with an Internet service provider (ISP).

Figure 1D:
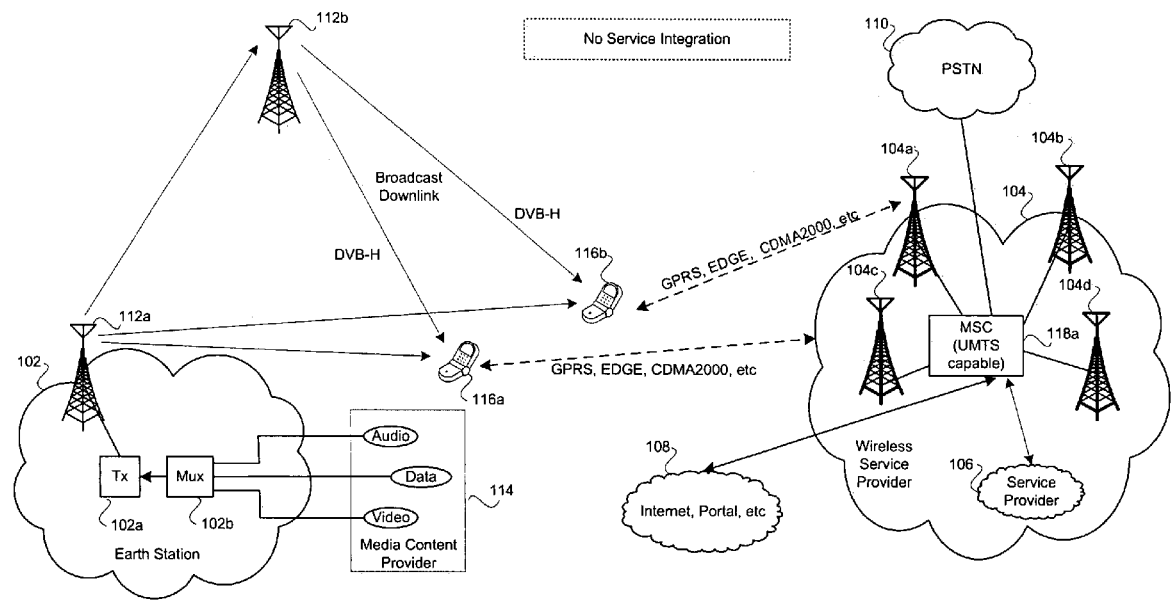
FIG. 1*d* is a block diagram of an alternative embodiment of the exemplary system of FIG. 1*a* for providing services between a cellular network and a digital video broadcast network, in accordance with an embodiment of the invention.

FIG. 1*d* is a block diagram of an alternative embodiment of the exemplary system of FIG. 1*a* for providing services between a cellular network and a digital video broadcast network, in accordance with an embodiment of the invention. Referring to FIG. 1*d*, there is shown terrestrial broadcaster network 102, wireless service provider network 104, portal 108, public switched telephone network (PSTN) 110, and mobile terminals (MTs) 116*a* and 116*b*. The terrestrial broadcaster network 102 may comprise transmitter (Tx) 102*a*, multiplexer (Mux) 102*b*, and VHF/UHF broadcast antennas 112*a* and 112*b*. The wireless service provider network 104 may comprise service provider 106, mobile switching center (MSC) 118*a*, and a plurality of cellular base stations 104*a*, 104*b*, 104*c*, and 104*d*.

The system of FIG. 1*d* is somewhat similar to the FIG. 1*a* with the exception that FIG. 1*d* has the service provider 106 co-located with the wireless service provider network 104. In this regard, the wireless service provider network 104 may control the functions of the service provider 106. Since the wireless service provider network 104 controls the functions of the service provider 106, cellular services may be more efficiently provided to the mobile terminals 116*a* and 116*b* via the cellular downlink path provided by the wireless service provider network 104. Hence, instead of having to send information to an externally located service provider 106 as illustrated in FIG. 1*a*, the wireless service provider network 104 and the service provider 106 may make decisions as to how best to handle communicating information to and from a mobile terminal. In this regard, the service provider 106 may also communicate with an Internet service provider.

In another embodiment of the invention, since many of the services provided by the service provider 106 may already be integrated into the wireless service provider's 104 infrastructure, then the complexity of the service provider functions may be significantly reduced. For example, the wireless service provider 104, the latter of which already has the pertinent infrastructure in place, may now handle operation administration maintenance and provisioning (OAM&P) functions, which may be required by the service provider 106. Since the uplink capabilities are inherent in only the wireless service provider network 104, and the service provider function are also located within the service provider network 106, the uplink capabilities for the mobile stations 116*a* and 116*b* may be more efficiently managed from within the wireless service provider network 104.

Figure 1E:
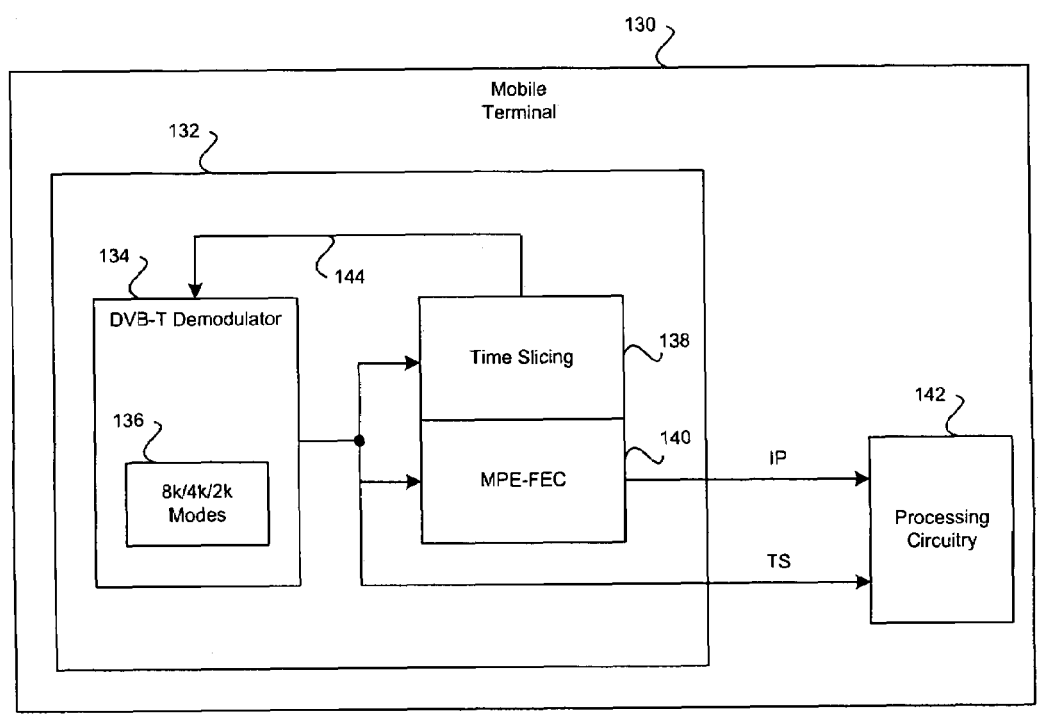
FIG. 1e is a high-level block diagram of exemplary DVB-H receiver circuitry in a mobile terminal, which may be utilized in connection with an embodiment of the invention.

FIG. 1*e* is a high-level block diagram of exemplary DVB-H receiver circuitry in a mobile terminal, which may be utilized in connection with an embodiment of the invention. Referring to FIG. 1*e*, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2 k, 4 k and/or 8 k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams. As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1F:
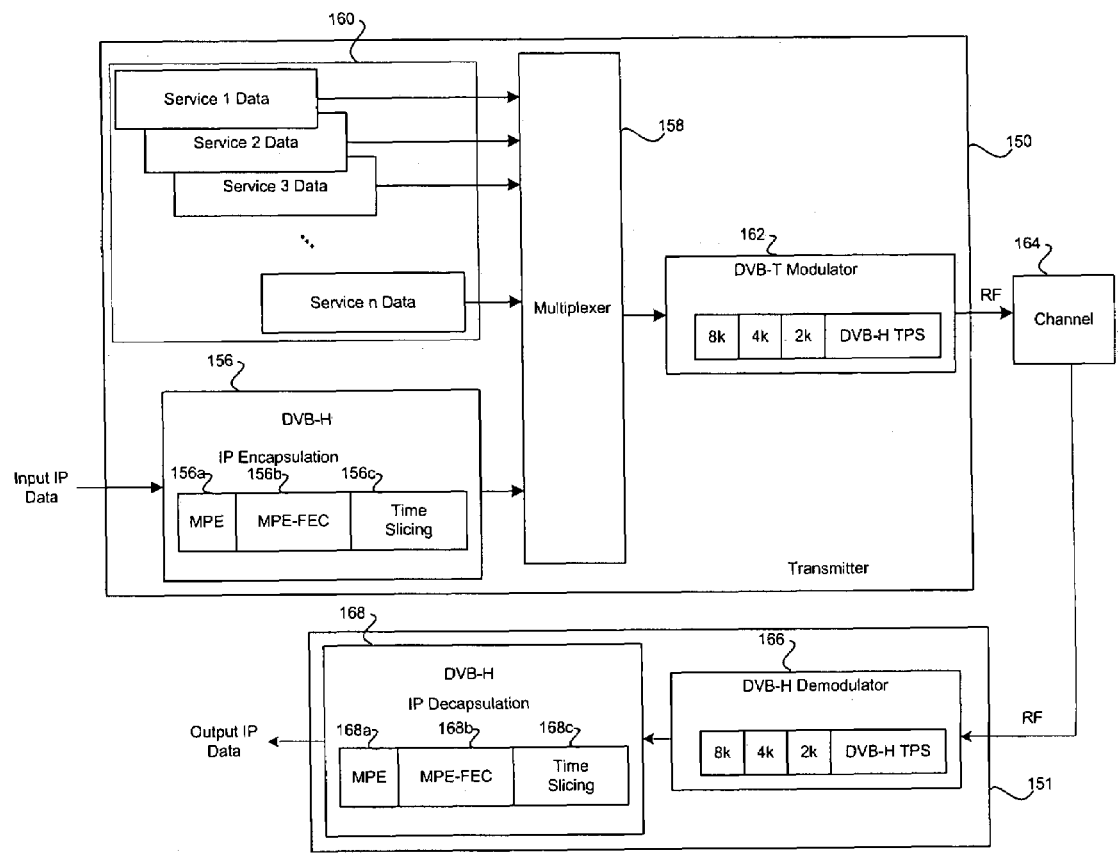
FIG. 1f is a block diagram illustrating the sharing of a multiplexer (MUX) by a plurality of MPEG2 services, which may be utilized in connection with an embodiment of the invention.

FIG. 1f is a block diagram illustrating the sharing of a multiplexer (MUX) by a plurality of MPEG2 services, which may be utilized in connection with an embodiment of the invention. Referring to FIG. 1f, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168.

The DVB-H encapsulator block 156 may comprise MPE block 156a, MPE-FEC block 156b and time slicing block 156c. The multiplexer 156 may comprise suitable logic circuitry and/or code that may be adapted to handle multiplexing of IP encapsulated DVB-H data and service data. The plurality of service data, collectively referenced as 160, may comprise MPEG-2 formatted data, which may comprise for example, audio, video and/or data. The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
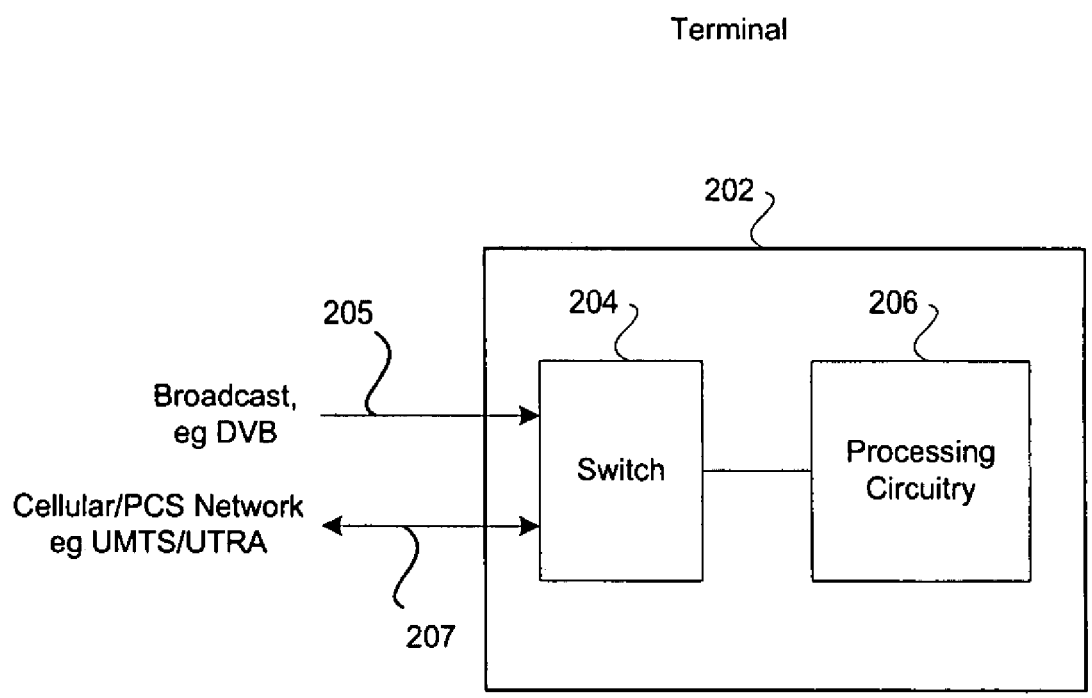
FIG. 2a is diagram of a mobile terminal that is adapted to receive VHF/UHF broadcasts and cellular communications, in accordance with an embodiment of the invention.

FIG. 2a is a block diagram of a mobile terminal that is adapted to receive VHF/UHF broadcasts and cellular communications, in accordance with an embodiment of the invention. Referring to FIG. 2a, there is shown mobile terminal (MT) or handset 202. The mobile terminal 202 may comprise a switch 204 and processing circuitry 206. The switch 204 may be adapted to switch between a broadcast signal 205 and a cellular signal 207. The broadcast signal 205 may comprise VHF/UHF broadcast channel and the cellular signal 207 may comprise at least one cellular channel. The cellular channel may be within the range of cellular frequency bands.

The processing circuitry 206 may comprise, for example, an RF integrated circuit (RFIC) or RF front end (RFFE). In this regard, the processing circuitry 206 may comprise at least one receiver front end (RFE) circuit. In an embodiment of the invention, a first of the receiver front end circuits may be adapted to handle RF processing of the VHF/UHF broadcast channel and a second of these RFE circuits may be adapted to handle RF processing of a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio. Processing between a VHF/UHF channel and a cellular channel may be user-selectable via the switch 204, for example.

Figure 2B:
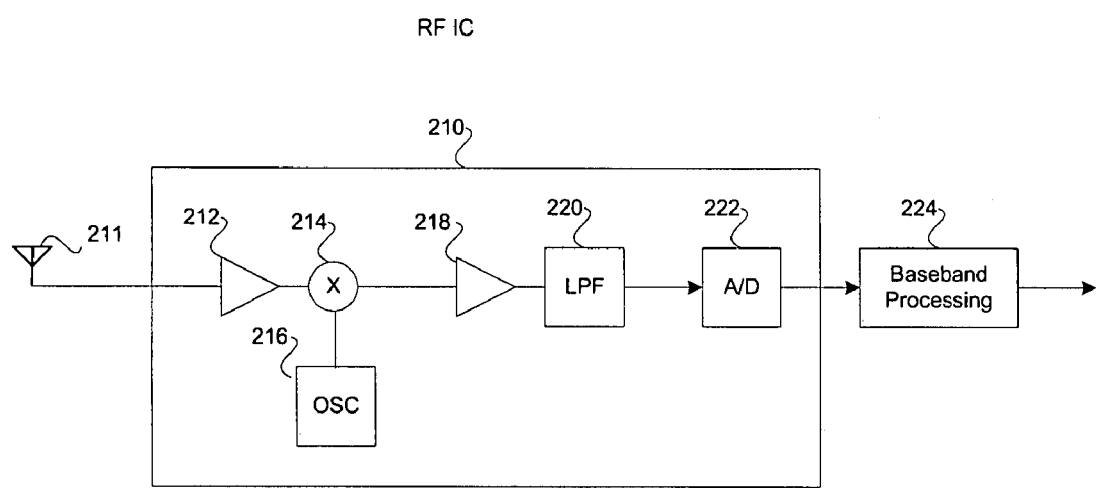
FIG. 2b is a block diagram illustrating receive processing circuit of an RF integrated circuit (RFIC), in accordance with an embodiment of the invention.

FIG. 2b is a block diagram illustrating receive processing circuit of an RF integrated circuit (RFIC), in accordance with an embodiment of the invention. Referring to FIG. 2b, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and and/or a plurality of signals in the VHF/UHF frequency band. U.S. application Ser. Nos. 11/080883, 11/011006, 11/010487, all of which are filed on even date herewith and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide an oscillating signal that may be adapted to mix the output signal generated from the output of the low noise amplifier 212 down to a baseband. The low noise amplifier (LNA) or amplifier 218 may comprise suitable circuitry and/or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received form an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 2C:
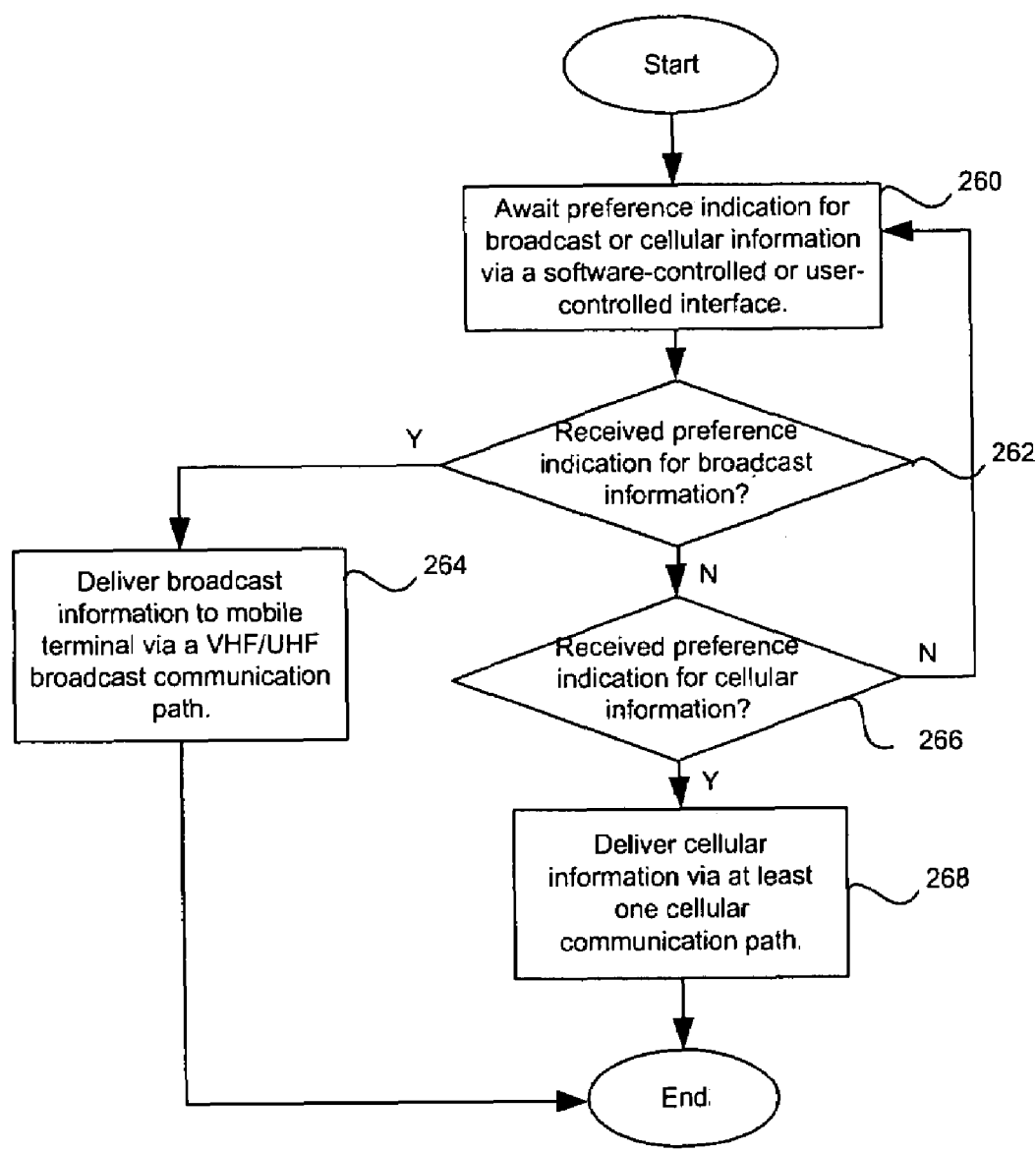
FIG. 2c is a flow diagram illustrating exemplary steps utilized by a mobile terminal that may be adapted to receive broadcast and cellular information, in accordance with an embodiment of the invention.

FIG. 2c is a flow diagram illustrating exemplary steps utilized by a mobile terminal that may be adapted to receive broadcast and cellular information, in accordance with an embodiment of the invention. Referring to FIG. 2c, at 260, the terminal may await a preference indication for broadcast or cellular information via a software-controlled or user-controlled interface. At 262, it may be determined whether preference indication for broadcast information is received. If preference indication for broadcast information is received, at 264, broadcast information may be delivered to a mobile terminal via a VHF/UHF broadcast communication path. If preference indication for broadcast information is not received, at 266, it may be determined whether preference indication for cellular information is received. If preference indication for broadcast information is received, at 268, cellular information may be delivered to the mobile terminal via at least one cellular communication path.

Figure 2D:
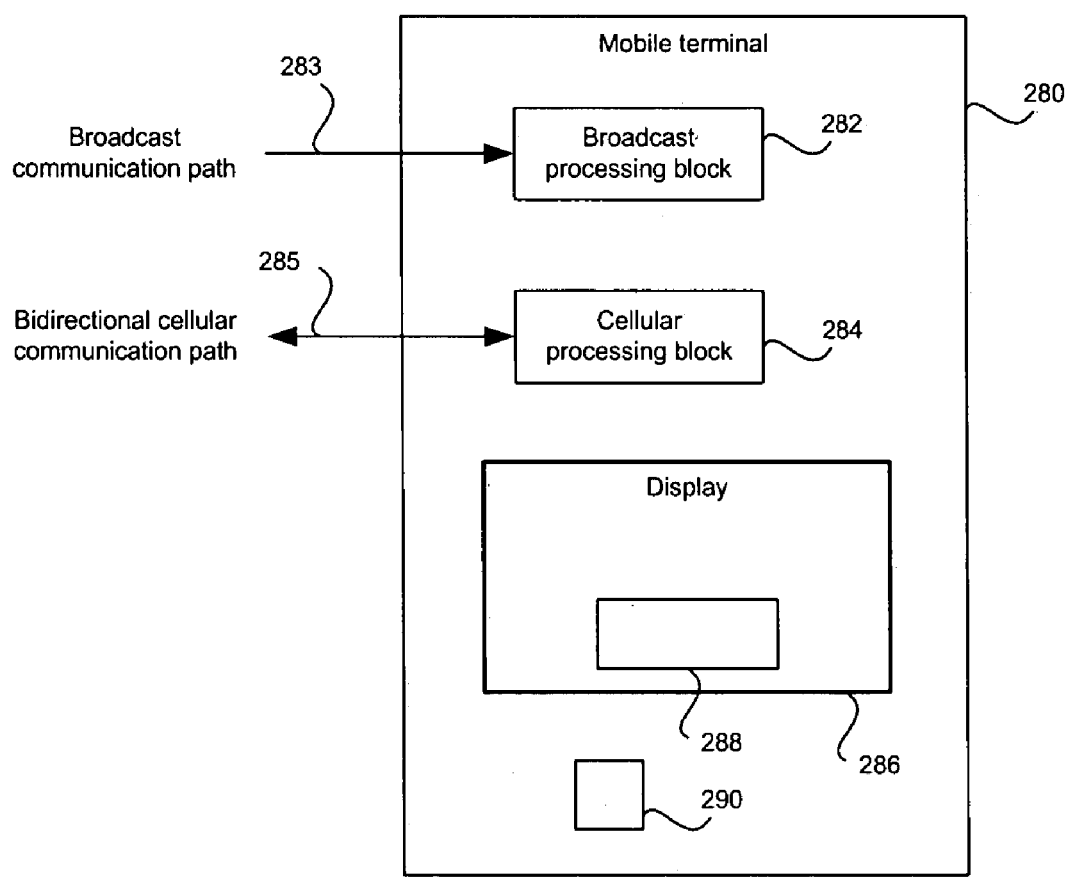
FIG. 2d is a block diagram illustrating exemplary communication between a mobile terminal and a plurality of different communication paths, in accordance with an embodiment of the invention.

FIG. 2d is a block diagram illustrating exemplary communication between a mobile terminal and a plurality of different communication paths, in accordance with an embodiment of the invention. Referring to FIG. 2d, there is shown a mobile terminal 280 that comprises a broadcast processing block 282, a cellular processing block 284, a display 286, and a hardware button 290. The mobile terminal 280 may comprise suitable logic, circuitry, and/or code that may be adapted to communicate and process information from a plurality of different networks. In this regard, the mobile terminal 280 may receive information, wherein the information may be voice, data, images, and/or applications, via a VHF/UHF broadcast communication path 283 and/or a bidirectional cellular communication path 285. The mobile terminal 280 may also transmit information via the bidirectional cellular communication path 285. In this regard, the transmitted information may be associated with information received from the VHF/UHF communication path 283 and/or the bidirectional cellular communication path 285.

The broadcast processing block 282 may comprise suitable logic, circuitry, and/or code that may be adapted to process broadcast information from, for example, the VHF/UHF communication path 283. The cellular processing block 282 may comprise suitable logic, circuitry, and/or code that may be adapted to process cellular information from, for example, the bidirectional cellular communication path 285. The cellular processing block 284 may comprise different portions that may process information associated with different cellular communication paths. In an exemplary aspect of the invention, the mobile terminal 280 may be adapted to switch between reception of broadcast information via the VHF/UHF communication path 283 and cellular information via the bidirectional cellular communication path 285 via a software-controlled and/or user-controlled interface. For example, switching between reception of broadcast information and cellular information may be achieved by utilizing a switch at the mobile terminal 280, such as the hardware button 290. In another aspect of the invention, the display 286 may be adapted to display a user interface 288. The user interface 288 may be software-controlled. In this regard, the user interface 288 may acquire user input and switching between reception of broadcast information and cellular information may be achieved by utilizing the software-controlled user interface 288.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information via a plurality of different networks, the method comprising:
   receiving, in a mobile handheld terminal, broadcast information via a VHF/UHF broadcast communication path;
   receiving, in said mobile handheld terminal, cellular information comprising voice and data via at least one cellular communication path; and
   switching, in said mobile handheld terminal, between reception of said broadcast information via said VHF/UHF broadcast communication path and said cellular information via said at least one cellular communication path based on a user preference indicated via said mobile handheld terminal.

2. The method according to claim 1, wherein said user preference is indicated in said mobile handheld terminal via at least one of the following: a software-controlled interface and a user-controlled interface.

3. The method according to claim 1, comprising switching in said mobile handheld terminal between reception of said broadcast information via said VHF/UHF broadcast communication path and said cellular information via said at least one cellular communication path based on user input.

4. The method according to claim 3, comprising acquiring, in said mobile handheld terminal, said user input by said mobile handheld terminal utilizing at least one hardware button.

5. The method according to claim 1, comprising receiving, in said mobile handheld terminal, an input that selects at least a portion of content associated with said broadcast information and at least a portion of said cellular information.

6. The method according to claim 5, comprising receiving, in said mobile handheld terminal, said selected at least a portion of content associated with said broadcast information via said VHF/UHF broadcast communication path.

7. The method according to claim 5, comprising receiving, in said mobile handheld terminal, said selected at least a portion of said cellular information via said at least one cellular communication path.

8. The method according to claim 1, comprising displaying, in said mobile handheld terminal, an indication of content that may be available via said VHF/UHF broadcast communication path and said at least one cellular communication path.

9. The method according to claim 1, comprising receiving, in said mobile handheld terminal, said broadcast information from a service provider.

10. The method according to claim 9, comprising generating, in said mobile handheld terminal, a request for broadcast information that instructs said service provider to deliver said requested broadcast information via said VHF/UHF broadcast communication path.

11. A machine-readable storage having stored thereon, a computer program having at least one code section for communicating information via a plurality of different networks, the at least one code section being executable by a machine for causing the machine to perform steps comprising:
   receiving in a mobile handheld terminal, broadcast information via a VHF/UHF broadcast communication path;
   receiving, in said mobile handheld terminal, cellular information comprising voice and data via at least one cellular communication path; and
   switching, in said mobile handheld terminal, between reception of said broadcast information via said VHF/UHF broadcast communication path and said cellular information via said at least one cellular communication path based on a user preference indicated via said mobile handheld terminal.

12. The machine-readable storage according to claim 11, wherein said user preference is indicated, in said mobile handheld terminal, via at least one of the following: a software-controlled interface and a user-controlled interface.

13. The machine-readable storage according to claim 11, comprising code for switching, in said mobile handheld terminal, between reception of said broadcast information via said VHF/UHF broadcast communication path and said cellular information via said at least one cellular communication path based on user input.

14. The machine-readable storage according to claim 13, comprising code for acquiring, in said mobile handheld terminal, said user input by said mobile handheld terminal utilizing at least one hardware button.

15. The machine-readable storage according to claim 11, comprising code for receiving, in said mobile handheld terminal, an input that selects at least a portion of content associated with said broadcast information and at least a portion of said cellular information.

16. The machine-readable storage according to claim 15, comprising code for receiving, in said mobile handheld terminal, said selected at least a portion of content associated with said broadcast information via said VHF/UHF broadcast communication path.

17. The machine-readable storage according to claim 15, comprising code for receiving, in said mobile handheld terminal, said selected at least a portion of said cellular information via said at least one cellular communication path.

18. The machine-readable storage according to claim 11, comprising code for displaying, in said mobile handheld terminal, an indication of content that may be available via said VHF/UHF broadcast communication path and said at least one cellular communication path.

19. The machine-readable storage according to claim 11, comprising code for receiving, in said mobile handheld terminal, said broadcast information from a service provider.

20. The machine-readable storage according to claim 19, comprising code for generating, in said mobile handheld terminal, a request for broadcast information that instructs said service provider to deliver said requested broadcast information via said VHF/UHF broadcast communication path.

21. A system for communicating information via a plurality of different networks, the system comprising:
   circuitry in a mobile handheld terminal that receives broadcast information via a VHF/UHF broadcast communication path;
   circuitry in said mobile handheld terminal that receives cellular information comprising voice and data via at least one cellular communication path; and
   circuitry in said mobile handheld terminal that switches between reception of said broadcast information via said VHF/UHF broadcast communication path and said cellular information via said at least one cellular communication path based on a user preference indicated via said mobile handheld terminal.

22. The system according to claim 21, wherein said user preference is indicated via at least one of the following: a software-controlled interface and a user-controlled interface.

23. The system according to claim 21, comprising circuitry in said mobile handheld terminal that switches between reception of said broadcast information via said VHF/UHF broadcast communication path and said cellular information via said at least one cellular communication path based on user input.

24. The system according to claim 23, comprising circuitry in said mobile handheld terminal that acquires said user input utilizing at least one hardware button.

25. The system according to claim 21, comprising circuitry in said mobile handheld terminal that receives an input that selects at least a portion of content associated with said broadcast information and at least a portion of said cellular information.

26. The system according to claim 25, comprising circuitry in said mobile handheld terminal that receives said selected at least a portion of content associated with said broadcast information via said VHF/UHF broadcast communication path.

27. The system according to claim 25, comprising circuitry in said mobile handheld terminal that receives said selected at least a portion of said cellular information via said at least one cellular communication path.

28. The system according to claim 21, comprising circuitry in said mobile handheld terminal that displays an indication of content that may be available via said VHF/UHF broadcast communication path and said at least one cellular communication path.

29. The system according to claim 21, comprising circuitry in said mobile handheld terminal that receives said broadcast information from a service provider.

30. The system according to claim 29, comprising circuitry in said mobile handheld terminal that generates a request for broadcast information that instructs said service provider to deliver said requested broadcast information via said VHF/UHF broadcast communication path.

* * * * *